April 7, 1959  A. DE KEIZER  2,881,227
PRODUCTION OF DIISOPROPYL BENZENES
Filed June 27, 1955
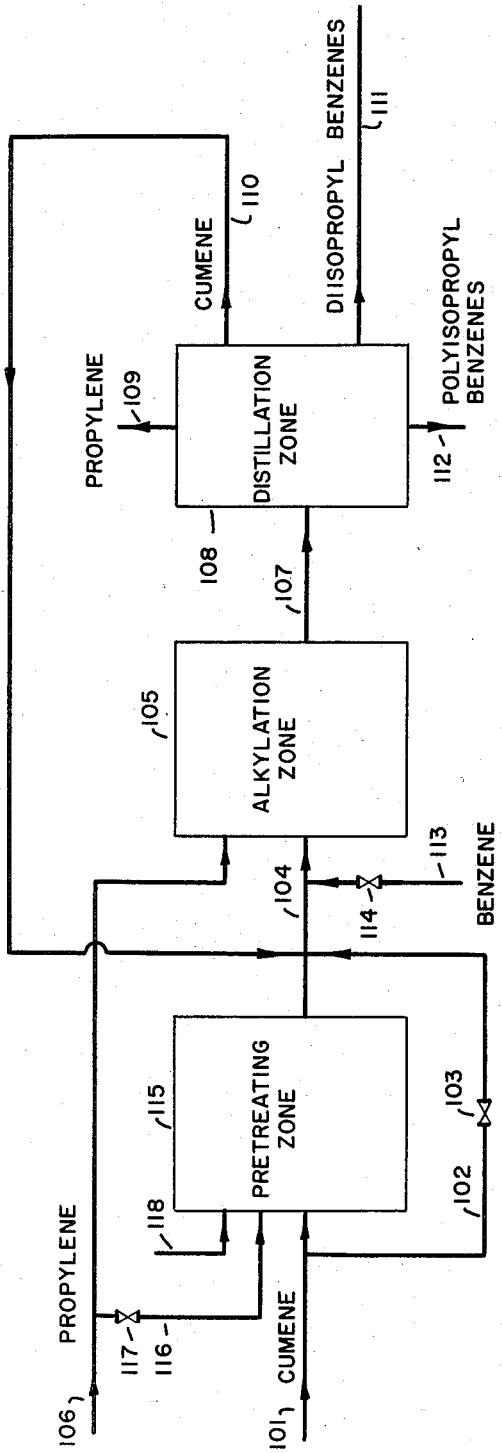
FIG. I
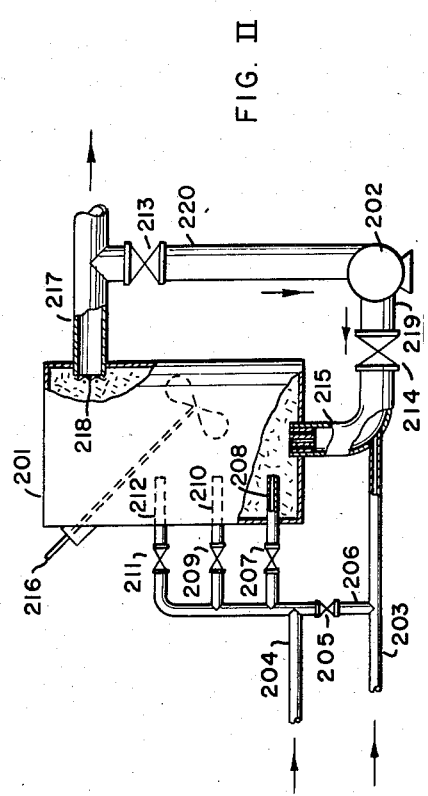
FIG. II
INVENTOR
ADRIANUS de KEIZER
BY *James Jodorovic*
THEIR ATTORNEY

United States Patent Office 2,881,227
Patented Apr. 7, 1959

2,881,227

PRODUCTION OF DIISOPROPYL BENZENES

Adrianus de Keizer, Amsterdam, Netherlands, assignor to Shell Development Company, New York, N.Y., a corporation of Delaware Application June 27, 1955, Serial No. 518,269

Claims priority, application Netherlands October 22, 1954

3 Claims. (Cl. 260—671)

This invention relates to the alkylation of benzene and cumene by reaction with propylene at alkylation conditions in the presence of a cracking catalyst. More specifically, the invention relates to a method for preparing, in a commercially attractive process at high production rates, diisopropyl benzenes containing a relatively large proportion of the para-isomer.

It is known to the prior art to alkylate benzene or cumene with propylene to produce diisopropyl benzene; aluminum silicate type catalysts have been used in this reaction. In these processes it has not been possible, however, to produce mixtures having sufficiently high para-diisopropyl benzene contents under conditions at which reasonable conversion of propylene was obtainable at reasonable production rates. Among the diisopropyl benzene isomers, para-diisopropyl benzene is a particularly useful compound because it is readily converted into the commercially important terephthalic acid.

It is a principal object of the present invention to provide a commercially useful process for preparing diisopropyl benzenes in high yield at high throughput rates by contact of cumene, alone or admixed with benzene, with propylene, in the presence of acidic siliceous cracking catalyst, at conditions at which the resulting alkylate contains a high concentration of para-diisopropyl benzene. Other objects of the present invention will appear from the following description thereof, which will be made with reference to the accompanying drawing, wherein:

Fig. I is a schematic flow sheet of a preferred mode of practicing the present invention; and Fig. II is a schematic drawing showing details of the preferred apparatus for carrying out the alkylation.

Briefly, the process of the present invention comprises contacting in the presence of a cracking catalyst propylene and cumene, alone or in admixture with benzene, at a mol ratio of aromatic to olefin of at least 3:1, a temperature in the range between 160° and 300° C. and a liquid hourly space velocity (L.H.S.V.) of at least 20 v./v./hr., separating the reaction mixture from the catalyst and recovering as product a mixture of alkyl benzenes containing at least 25% diisopropyl benzenes whereof a major proportion is para-diisopropyl benzene. In a preferred modification of the present invention, the alkylation is carried out by charging the aromatic and the propylene at a molar ratio not higher than the highest permissible degree of alkylation, at a liquid hourly space velocity of at least 20 v./v./hr., into a uniform reaction mixture comprising the aromatic, alkylated reaction product, powdered cracking catalyst, and no more than 1 mol percent unconverted propylene, maintaining the resulting admixture at a temperature in the range between 160° and 300° C., separating some of the admixture from the catalyst and recovering as product a mixture of alkyl benzenes comprising at least 25% diisopropyl benzene. It has been further found that a special advantage is obtained in the present process by employing as charge to the alkylation cumene which has been pretreated by contact with a cracking catalyst in the presence of at least 0.01 mol percent, but less than an equivalent amount, of an olefin under alkylating conditions. In order to obtain the full advantage of this last modification, at least 50% of the aromatic charged to the alkylation should be pretreated. A very substantial increase in permissible throughput rates, up to 50 to 100 v./v./hr. is obtainable by employing the pretreated cumene.

A great advantage of the present process is that it not only leads to a high diisopropyl benzene content in the reaction product, but that this fraction contains a major portion of the para-isomer.

Referring now to Fig. I, cumene is charged to the system through line 101, from a source not shown. From line 101 a portion of the cumene may pass through by-pass line 102, controlled by valve 103, into line 104 and into alkylation zone 105. Propylene, which may be highly concentrated or admixed with a substantial proportion of propane, as found in many refinery streams, is charged through line 106 into alkylation zone 105. In the alkylation zone the cumene and propylene are reacted in the presence of a cracking catalyst, under conditions further described below, to produce a reaction mixture containing diisopropyl benzenes. The reaction mixture is withdrawn from the catalyst and passed through line 107 into fractional distillation zone 108 from which the following streams may be withdrawn: through line 109 an overhead stream of propylene which may be returned to the process; through line 110 unconverted cumene which may be returned to the process as shown; through line 111 the desired mixture of di-alkyl benzenes which may be separated, in equipment not shown, to recover desired particular isomers, especially para-diisopropyl benzene; and through line 112 a bottoms stream of poly-isopropyl benzenes containing three or more isopropyl groups per molecule.

If desired, benzene may be admixed with the cumene charged to the alkylation zone by adding it through line 113 controlled by valve 114. Benzene may also be recovered separately from distillation zone 108 and returned to the process.

In the preferred mode of operating the present process, valve 103 in by-pass line 102 is closed and all the cumene is charged from line 101 into pretreater 115 which contains cracking catalyst and is operated under conditions substantially like those suitable for use in the alkylation zone. A small amount of propylene may be admitted into the pretreater through line 116 controlled by valve 117. If desired, any other suitable olefin may be added through line 118, in which case valve 117 will remain closed. The amount of propylene or other olefin added may be as little as 0.01 mol percent, based on the cumene, or may be more but not sufficient to monoalkylate all of the cumene, i.e. not an equivalent amount. The propylene or other olefin may be added into line 101 before it enters the pretreating vessel.

It will be seen that the cumene recycled to the alkylation zone through line 110 will have been subjected to alkylating conditions in the presence of propylene even if pretreater 115 is not in operation. Therefore the advantages of this invention are obtained without operating pretreater 115 if the alkylation zone 105 is operated in such a manner that a sufficient portion of cumene remains in the product in line 107 so that the amount recovered in line 110 and returned thereby to line 104 is at least equal to the amount entering line 104 from line 102.

Referring now to Fig. II, it presents a more detailed, though still schematic, picture of alkylation zone 105. The equipment shown consists of stirred alkylation vessel 201, circulating pump 202, and connecting lines and valves. Cumene, admixed with benzene if desired, is charged through line 203, corresponding to line 104 of Fig. I. Propylene is charged through line 204, corresponding to line 106. Propylene may be admixed with the cumene by opening valve 205 in connecting line 206. Propylene may also be charged directly into the alkylation vessel 201 by opening any of valves 207, 209 and 211 in lines 208, 210 and 212. In one method of operation, circulating pump 202 is not employed and in this case valves 213 and 214 remain closed. Cumene, admixed with propylene if desired, is charged through line 203 into inlet line 215. Once operation is established, reactor 201 is full of a slurry of powdered cracking catalyst in the reaction mixture. The slurry may be maintained in a uniform condition by stirrer 216 operated by means not shown. Reaction mixture is continuously withdrawn from reactor 201 through outlet line 217, protected by screen 218 which keeps the powdered catalyst from being removed from the reaction vessel. In some cases, it may be desirable to provide extra capacity or additional agitation by circulating reaction mixture from the outlet to the inlet of the reactor and this is done by opening valves 213 and 214 and operating pump 202 so that liquid passes from line 217 to line 220, line 219, and back to inlet line 215.

The conditions under which the alkylation zones in Figs. I and II are operated will be described in detail below.

Since Fig. I is a schematic flow diagram, it will be understood that details of equipment such as specific vessels, pumps, valves, connecting lines and the like are not shown therein. These details will be readily supplied by anyone skilled in the art. Pretreating zone 115 and alkylation zone 105 will include associated equipment such as heaters to maintain suitable reaction temperatures. Distillation zone 105 may represent a number of conventional fractionating columns, such as bubble-tray or packed columns, equipped with reboilers and condensers, operating in series or otherwise to recover the several individual fractions. The fractionating zone should be operated by charging the total feed to a column in which the lightest component is taken overhead and the remaining bottom is charged to the next column, in which the lightest remaining product is taken overhead and the bottom again charged to the next column. In this manner all the diisopropyl benzenes are ultimately recovered as distillates and their thermal degradation is avoided altogether, or minimized. Similarly, Fig. II is only a schematic representation and therefore associated equipment such as motors, packing glands, sight glasses, metering devices and the like are not shown.

The aromatic hydrocarbon employed as charge stock in the present invention is isopropyl benzene, i.e. cumene. Benzene may also be included in the charge to the process. These aromatics may be charged in pure form or in the form of admixtures with other hydrocarbons, preferably those which are not converted under conditions of the present process. Especially in the modification as described above by means of Fig. II, the aromatic hydrocarbons may be present in concentrations of 15 to 50% in liquid mixtures resulting from hydrocarbon conversion processes such as hydroforming, platforming, aromatization or the like, which are conventionally employed in petroleum refineries and are well known to the art. Benzene may be employed, for example, in the form of a close-cut platformate, which is a fraction containing no other aromatic hydrocarbon but containing a substantial proportion of non-aromatic hydrocarbons of the same boiling range.

Propylene is the only olefin which may be employed in the alkylation step of the present invention. As has been mentioned, it may be charged as a highly concentrated olefin stream or diluted with non-olefin, especially propane. In petroleum refineries the $C_3$ cut recovered from thermal or catalytic cracking processes may contain from 20 or 30 to 80% or more propylene, the rest being propane. Such cuts are suitable, but it is preferred to have at least 40 or 50% propylene present in the fraction employed.

In the pretreating step of the present invention the olefin employed need not necessarily be propylene but may be any desired olefin from ethylene through pentadecene, either highly concentrated or admixed with inert hydrocarbons such as paraffins and naphthenes. The olefin cut employed in the pretreating step should have a different boiling range from cumene so that the treated cumene may be readily separated by distillation. When the pretreated cumene is charged directly to the alkylation step as shown in Fig. I, the olefin employed in the pretreat also should have a different boiling range from the diisopropyl cumenes so that it will not contaminate the product recovered from the alkylation.

The catalysts suitable in the alkylation of the present invention as well as in the pretreating step belong to the group of cracking catalysts, i.e. those substances which can also serve as catalysts in cracking petroleum. In the process according to the invention cracking catalysts of the silicate type are preferably used. These catalysts mainly consist of silicon dioxide, while smaller quantities of one or more oxides of other metals, such as aluminum, zirconium, magnesium, calcium, sodium, and potassium, may also be present, chemically bound to the silicon oxide to form silicates. Other oxides, such as those of hydrogen, carbon and sulfur, may also occur in a chemically bound form. Usually, however, water is present in the oxide mass in a free or very loosely bound form. In many instances only traces of certain oxide components occur in the catalysts.

In the process according to the invention catalysts of the alumina-silica type are especially preferred, i.e. cracking catalysts mainly consisting of $Al_2O_3$ and $SiO_2$, in which other components, such as those mentioned, may be present in small quantities or traces. These catalysts usually have a higher $SiO_2$ than $Al_2O_3$ content. A suitable ratio by weight is, for example, 70–90% by weight of $SiO_2$ and 30–10% by weight of $Al_2O_3$.

It is desirable that the catalyst have a high activity. It has been found that the water content of the catalyst has a great influence on the activity and that catalyst having a water content greater than .5% by weight is not sufficiently active to be useful in the present invention. In general, water contents lower than 2% by weight, and preferably water contents between 0.1 and 0.2% by weight are particularly advantageous.

In order to keep the catalyst at the required moisture content, it is necessary to maintain the water content of the hydrocarbon streams charged to the process at a very low value. The water content of the total hydrocarbon charge should be less than 0.25% by weight, and preferably less than 0.02% by weight.

Control and correlation of the reaction conditions in the alkylation step are essential to the successful operation of the present invention. The alkylation is carried out with the hydrocarbon in the liquid phase. The pressure in the alkylation zone is therefore maintained sufficiently high to keep the mixture of reactants and product in the alkylation zone liquid at the temperature employed. Pressures in the range from 10 to 80 atmospheres, absolute, are suitable.

The reaction temperature affects, to a considerable extent, the course of the alkylation. Temperatures in the range between 160° and 300° C. may be employed. Particularly good results are obtained in the range between 180° and 240° C. and especially at about 200° C. The effect of reaction temperature and other variables on the course of the alkylation reaction will be illustrated below by means of examples.

The throughput rate or liquid hourly space velocity (L.H.S.V.) is a particularly important variable in the present invention. This quantity is a measure of the flow rate of the reactants; it is expressed as the number of parts by volume of liquid which passes through the reaction zone per part of catalyst per hour (v./v./hr.). In a given system, i.e. for a fixed reactor volume and fixed volume of catalyst, the L.H.S.V. varies inversely as the contact time; i. e., at a high L.H.S.V. the time of contact of the reactants with the catalyst is relatively short.

The optimum L.H.S.V. may vary within relatively wide limits according to the nature and activity of the catalyst, the molar ratio of aromatic to propylene, the alkylation temperature and the type of cumene feed stock employed. If the cumene were not pretreated, L.H.S.V. values in the range between 4 and 10 would have to be employed. Higher throughput rates, up to 20 v./v./hr., might be employed, but under these conditions the yield of alkylated products would decrease. Some of the propylene may be polymerized under such conditions, rather than being reacted with the aromatics present.

In the mode of operation according to this invention, in which at least 50% of the cumene is pretreated as described above, liquid hourly space velocities in the range from 20 to 100 may be employed, the range between 20 and 50 being preferred. In a particularly preferred modification, all the cumene charged to the alkylation zone is pretreated and the L.H.S.V. in this case is preferably above 40 and below 100 v./v./hr.

The ratio of aromatic to propylene in the charge, and specifically of cumene to propylene, also substantially affects the results of the alkylation. Best results are obtained at relatively high ratios of cumene to propylene; although mol ratios as low as 2:1 may be employed, it is preferable to have a ratio of at least 5:1. The higher the ratio of cumene to propylene in the alkylation zone, the greater will be the relative yield of the desired diisopropyl benzenes compared to the undesired triisopropyl- or other polyisopropyl-benzenes. Ratios as low as 3:1 and as high as 12:1 may be employed, but for practical reasons values in the range between 5:1 and 8:1 are preferred. It will be seen that in the modification described by means of Fig. II, an improvement in the yield of diisopropyl benzene is obtainable since the ratio of cumene to propylene in the reaction mixture is maintained relatively high.

The pre-treatment of cumene should preferably be effected under such conditions that at least some attachment, splitting off or exchange of alkyl groups occurs. It is therefore advisable that, in addition to the alkylation catalyst, at least a small quantity of an olefin should be present if commercial cumene is pre-treated. The amount of olefin present during the pre-treatment should preferably be at least 0.01% by weight with respect to cumene. The conditions, in particular the temperature and pressure, should, if high concentrations of olefin are present, be preferably such as to obtain the greatest possible conversion of the olefin in order to prevent polymerization thereof. The cumene thus treated may, if desired, first be concentrated by fractional distillation before it is passed to the essential alkylator. It will, however, be understood that the presence of a small quantity of diisopropyl benzenes causes no inconvenience.

The following examples illustrate various aspects of the present invention. In each example the alkylation was carried out in the presence of a synthetic cracking catalyst of the aluminum silicate type. The catalyst was analyzed, first being heated to a temperature of 900° C. The loss of weight on heating was 1.5%. The remaining material had the following composition:

11.6% by weight of $Al_2O_3$
88.4% by weight $SiO_2$ and traces of Fe, Na, K and Ca. Prior to the above-described analysis the catalyst contained 0.2% by weight of water removable by heating at 450° C.

EXAMPLE I

A series of tests were made in which, on each occasion, a mixture of cumene, not treated in accordance with this invention, and propylene in a molar ratio of approximately 5:1 was passed through a cylindrical reaction vessel which had a diameter of 2.5 cm. and a height of 30 cm. The reactor contained 100 ml. of the above-described catalyst in the form of 4 x 4 mm. pellets.

The reaction temperature and L.H.S.V. employed in the several runs are shown in Tables I and II. The pressure was 60 atm. abs. and the total run length was 20 hours.

*Table I.—Effect of temperature*

| Run number | Temperature, °C. | L.H.S.V., v./v./hr. | $C^-_3$ Conversion mol percent | Percent para-isomer in the diisopropyl benzene fraction obtained |
|---|---|---|---|---|
| 1 | 120 | 2 | 84 | 48 |
| 2 | 140 | 2 | 99 | 50 |
| 3 | 160 | 2 | 99 | 53 |
| 4 | 200 | 2 | 99 | 46 |
| 5 | 240 | 2 | 99 | 38 |
| 6 | 160 | 6 | 80 | -- |
| 7 | 200 | 6 | 96 | 53 |

The effect of various reaction temperatures at a constant L.H.S.V. of 2 v./v./hr. is illustrated in the runs 1 through 5 of Table I. Although the present invention is not concerned with operating at such a low space velocity the data do illustrate the effect of temperature, which is that at higher temperatures there is a more complete conversion of propylene. It is also shown that the percent of the para-isomer contained in the diisopropyl benzene fraction is not constant and, in fact, reaches a peak value. At 2 v./v./hr., complete conversion is obtained at a temperature as low as 140° C. and the peak value of para-isomer is reached at 160° C.

Runs 6 and 7 of Table I illustrate that at 6 v./v./hr. the temperature of 160° C. is insufficient to give complete propylene conversion, whereas a temperature of 200° is sufficient. Furthermore, the percent of para-diisopropyl benzene in the product at the relatively higher temperature of 200° C. is as high as that obtainable at 160° C. when operating at 2 v./v./hr. and much higher than that obtainable at 200° C. and 2 v./v./hr.

The effect of L.H.S.V. is further illustrated by means of Table II, in which some of the runs are the same as those shown in Table I.

*Table II.—Effect of liquid hourly space velocity*

| Run number | Temperature, °C. | L.H.S.V., v./v./hr. | $C^-_3$ Conversion, mol percent | Percent para-isomer in the diisopropyl benzene fraction obtained | Production of para-diisopropyl benzene in grams/liter/hour |
|---|---|---|---|---|---|
| 1 | 160 | 2 | 99 | 53 | -- |
| 2 | 160 | 6 | 80 | -- | 276 |
| 3 | 200 | 2 | 99 | 46 | 126 |
| 4 | 200 | 4 | 98 | 52 | -- |
| 5 | 200 | 6 | 96 | 53 | 372 |
| 6 | 200 | 10 | 80 | 55 | 585 |

Runs 1 and 2 of Table II illustrate that at 160° C. the increase in L.H.S.V. from 2 to 6 causes propylene conversion to drop, from about 99 to 80%. It should not be concluded, however, that the drop is entirely proportional to the change in L.H.S.V. in this range, since substantially complete conversion is still obtained at space velocities appreciably greater than 2.

Runs 3 through 6 of Table II were all made at 200° C. and at space velocities varying from 2 to 10 v./v./hr. These results clearly illustrate the substantial increase in the percent of para-diisopropyl benzene in the total diisopropyl benzenes when the L.H.S.V. is increased from 2 to 4. A further improvement is obtained in the percent of para-isomer on increasing the space velocities from 4 to 10. At 10 v./v./hr. and 200° C. the propylene conversion is no longer complete.

EXAMPLE II

The following example illustrates the effect of pretreating the cumene according to the present invention.

Cumene was alkylated by means of propylene in order to obtain diisopropyl benzene as the final product. In order to limit the formation of too highly alkylated products, an alkylation degree of 1/3 was aimed at. This is one isopropyl group per 3 cumene molecules originally present.

The reaction was carried out in a three liter autoclave provided with a multiblade stirrer. Catalyst particles were prevented from penetrating into the discharge by means of a built-in filter. For 15 hours the mixture to be converted was passed continuously through the autoclave in which there was a pressure of 25 atm. abs., the temperature of the liquid in the autoclave being 200° C. The starting material was a technical mixture of propylene and propane which was mixed with cumene and introduced into the reaction vessel. The molar ratio of propylene to cumene in the feed stream was 1:3.

The stirrer had a speed of 400 revolutions per minute.

The catalyst employed was of the same material as that described above. However, it was not pelleted but was employed as a powder having a particle size range from 50 to 300 microns. The quantity of catalyst used had a volume of 1 liter in a settled state.

The cumene introduced in the reaction vessel was commercial cumene which, in the presence of 0.05 mol percent of propylene, had been pretreated with the same cracking catalyst as was used in the alkylation. Entirely analogous results, however, were also obtained with cumene which had been recovered by distillation from previous alkylations under the same conditions in which it had remained unconverted, with cumene which was obtained by transalkylation of benzene from ortho and meta-diisopropyl benzene and/or higher isopropylated benzene derivatives, and with cumene obtained as by-product in the isomerization of ortho and meta-diisopropyl benzene, all of these reactions having been carried out in the presence of a cracking catalyst under alkylating conditions. Mixtures in different mixing ratios of the types of cumene obtained in these various ways could also be used with the same result.

The results obtained with cumene pretreated for the purpose are shown in the following table.

| L.H.S.V., v/v/hr. | Concentration of catalyst in reaction mixture (vol. percent) | Propylene (mol percent) | | |
|---|---|---|---|---|
| | | Total converted | Converted into polymers | Free in reaction mixture drawn off |
| 7.5 | 30 | 97.5 | 0.1 | 0.74 |
| 15 | 21.4 | 98 | 0 | 0.66 |
| 45 | 7.1 | 98.5 | 0 | 0.4 |
| 135 | 2.4 | 89 | 9.8 | 2.7 |

It was therefore found that even when L.H.S.V.=135 the propylene conversion was still nearly 90%. Nevertheless, L.H.S.V. values below 135 will be preferred in practice since the conversion into polymers was undesirably high in this case.

I claim as my invention:

1. Process for producing diisopropyl benzenes which comprises contacting cumene in a pretreating step with a siliceous cracking catalyst in the presence of at least 0.01 weight percent but less than an equivalent of propylene under alkylating conditions, recovering unconverted pretreated cumene from said pretreating step, admixing said pretreated cumene with no more than a minor amount of crude cumene to form the aromatic charge stock for alkylation, contacting said aromatic charge stock with propylene at a mol ratio of at least 3:1 in the presence of a siliceous cracking catalyst, in the liquid phase, at a temperature in the range between 160° and 300° C. and at a liquid hourly space velocity in the range from 20 to 100 v./v./hr. and recovering as product a mixture of monocyclic aromatics comprising at least 25% diisopropyl benzenes containing a major proportion of para-diisopropyl benzene.

2. Process for producing diisopropyl benzenes which comprises contacting cumene in a pretreating step with a siliceous cracking catalyst in the presence of from 0.01 to about 0.05 weight percent of propylene under conditions including a temperature in the range between 160° and 300° C. and a pressure in the range from 10 to 80 atm. abs., recovering unconverted pretreated cumene from said pretreating step, admixing said pretreated cumene with no more than a minor amount of crude cumene to form the aromatic charge stock for alkylation, contacting said aromatic charge stock with propylene at a mol ratio of cumene to propylene in the range from 5:1 to 8:1 in the presence of a siliceous cracking catalyst in the liquid phase at a temperature in the range between 180° and 240° C. and at a liquid hourly space velocity in the range from 20 to 50 v./v./hr. and recovering as product a mixture of monocyclic aromatics comprising at least 25% diisopropyl benzene containing a major proportion of para-diisopropyl benzene.

3. Process for producing diisopropyl benzenes which comprises contacting cumene in a pretreating step with a siliceous cracking catalyst in the presence of from 0.01 to about 0.05 weight percent of propylene under conditions including a temperature in the range between 160° and 300° C. and a pressure in the range from 10 to 80 atm. abs., recovering unconverted pretreated cumene from said pretreating step, contacting said pretreated cumene with propylene at a mole ratio of cumene to propylene of at least 3:1 in the presence of a siliceous cracking catalyst in the liquid phase at a temperature in the range between 160° and 300° C. and at a liquid hourly space velocity in the range from 40 to 100 v./v./hr. and recovering as product a mixture of monocyclic aromatics comprising at least 25% diisopropyl benzene containing a major proportion of para-diisopropyl benzene.

References Cited in the file of this patent

UNITED STATES PATENTS

| 2,395,198 | Schulze | Feb. 19, 1946 |
|---|---|---|
| 2,419,796 | Schulze | Apr. 29, 1947 |
| 2,436,698 | Oblad | Feb. 24, 1948 |
| 2,592,589 | Nickels | Apr. 15, 1952 |
| 2,730,557 | Max et al. | Jan. 10, 1956 |
| 2,744,150 | Enos | May 1, 1956 |

FOREIGN PATENTS

| 526,954 | Belgium | Sept. 4, 1954 |
|---|---|---|
| 526,955 | Belgium | Sept. 4, 1954 |
| 1,088,332 | France | Sept. 8, 1954 |
| 749,186 | Great Britain | May 23, 1956 |
| 749,187 | Great Britain | May 23, 1956 |